United States Patent [19]

Clarke et al.

[11] Patent Number: 4,502,186
[45] Date of Patent: Mar. 5, 1985

[54] CLIP FOR SECURING HOSEPIPES AND LIKE USES

[75] Inventors: Herbert E. Clarke, Swanage; Peter R. Lampkin, Godstone, both of England

[73] Assignee: Blounthurst Limited, Kidlington, England

[21] Appl. No.: 313,115

[22] Filed: Oct. 20, 1981
(Under 37 CFR 1.47)

[51] Int. Cl.$^3$ .............................................. F16L 33/00
[52] U.S. Cl. ................................ 24/16 PB; 24/20 TT
[58] Field of Search ............ 24/16 PB, 201 C, 20 TT, 24/17 AP, 30.5 P

[56] References Cited

U.S. PATENT DOCUMENTS

| | | | |
|---|---|---|---|
| 973,532 | 10/1910 | McLaughlin | 24/20 TT |
| 2,969,216 | 1/1961 | Hallsey | 24/16 PB |
| 3,459,234 | 8/1969 | Richter et al. | 24/201 C |
| 3,513,508 | 5/1970 | Modeme | 24/16 PB |
| 3,517,702 | 6/1970 | Mueller et al. | 24/16 PB |
| 3,605,200 | 9/1971 | Vallinotto et al. | 24/20 TT |
| 3,925,851 | 12/1975 | Bevans | 24/20 TT |
| 4,128,918 | 12/1978 | Wenk | 24/20 TT |
| 4,183,120 | 1/1980 | Thorne | 24/20 TT |
| 4,263,697 | 4/1981 | Speedie | 24/16 PB |
| 4,317,262 | 3/1982 | Wells, Jr. | 24/16 PB |

FOREIGN PATENT DOCUMENTS 474725  4/1963  Australia .......................... 24/16 PB

*Primary Examiner*—John J. Wilson
*Assistant Examiner*—James R. Hakomaki
*Attorney, Agent, or Firm*—Ladas & Parry

[57] ABSTRACT

A clip, more particularly a hose clip, including a band furnished with ratchet coupling elements comprising serrated jaws on one end of the band and a serrated tongue on the other end of the band. The tongue is insertible longitudinally between the jaws to interlock serrations on opposite sides of the tongue with the serrations of the respective jaws and thereby lock the tongue against withdrawal longitudinally. The jaws are open laterally, permitting sideways disengagement of the tongue therefrom to release the clip. The clip may be a one-piece plastics moulding.

2 Claims, 3 Drawing Figures

CLIP FOR SECURING HOSEPIPES AND LIKE USES

BACKGROUND OF THE INVENTION

This invention relates to clips and more particularly hose clips for securing hose-pipes and like uses.

PRIOR ART STATEMENT

There are a number of known forms of hose clips of the type comprising a band equipped with fittings of various kinds, including worm-drive devices and single ratchet-type dog-tooth devices, for contracting the band to thereby tighten it and clamp the clip about a hose which it encircles. Such prior art clips suffer disadvantages of one sort or another including being difficult or time-consuming to apply, being unreliable in service, being insufficiently strong to retain the pressures to which the hose and the clip may be subjected in use, being expensive to manufacture, or although intended to be reusable, becoming unserviceable after only one or two times of reuse, which is uneconomic.

SUMMARY OF THE INVENTION

According to this invention, with the object of overcoming the above-described and other disadvantages of the prior art, and more particularly to provide an improved clip which is inexpensive to produce, is durable and reliable in service and is reusable many times satisfactorily, a releasable clip is provided which comprises a band carrying complementary coupling elements of a ratchet coupling for connecting ends of the band and drawing them together to contract the clip, the coupling elements consisting of a serrated tongue on one end of the band and a pair of serrated jaws on the other end of the band, which jaws define a jaw mouth through which the tongue is insertible in its longitudinal direction tip first into the jaws, the tongue having serrations on opposite sides thereof adapted to interlock with the serrations of the jaws respectively and thereby form a double bond holding the inserted tongue to prevent withdrawal movement thereof in its longitudinal direction, the tongue and jaws being moveable relative to each other sideways such that the inserted tongue is disengageable sideways from the jaws to release the clip.

The coupling elements, or either of them such as particularly the jaws element, will possess sufficient inherent resilient yieldability to allow the tips of the serrations to pass over one another to enable the serrations to be brought into interlocking relation.

The bearing face of each serration acts as a pawl, locking into its reverse counterpart and being held there by the diametrically opposed counterparts on the opposing jaws, thus producing the double bond above-mentioned of great strength, the dynamic tension being enhanced when the pressure produced by the clip encircling and clamping a hose exerts an impacting action on the resilient hose material. The tighter the clamping, the greater the dynamic tension and the stronger the double bond grip.

The clip may be made of a plastics material suitable for the purpose of use. It may be moulded in one piece. The clip may, however, be made of suitable metal such as steel which may be preferred for larger sizes of clip where greater pressures in use are involved.

The clip may be provided with grips associated with the coupling elements to facilitate pressing the tongue into the jaws manually or with the aid of a suitable tool.

BRIEF DESCRIPTION OF THE DRAWINGS

In the accompanying drawings.

DESCRIPTION OF THE PREFERRED EMBODIMENT

Figure 1:
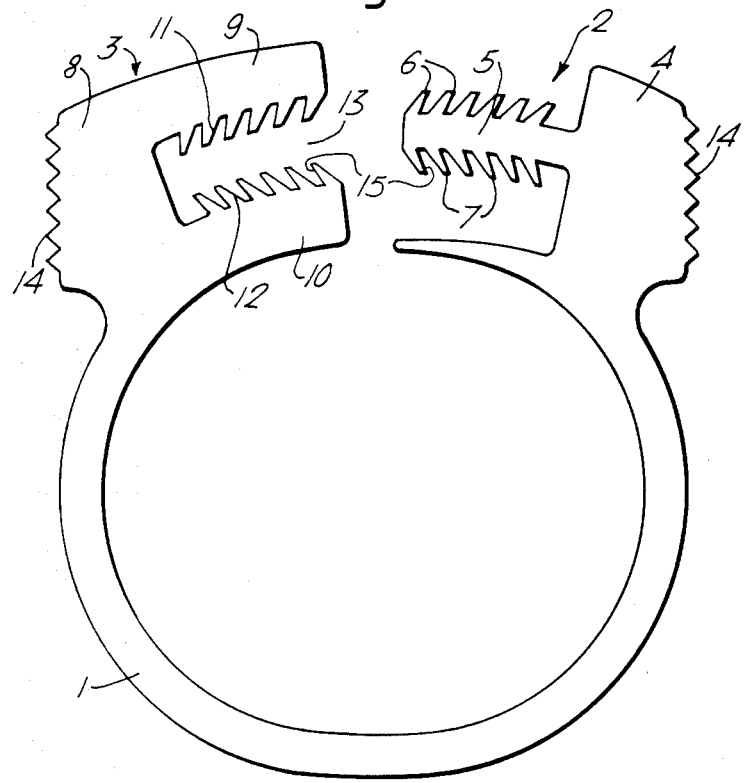
FIGS. 1 and 2 are views at right angles to one another of a preferred embodiment of clip according to the invention.
Figure 2:
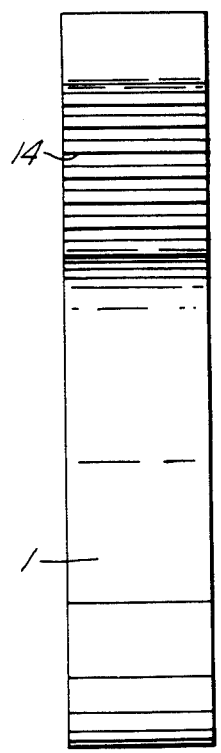
Figure 3:
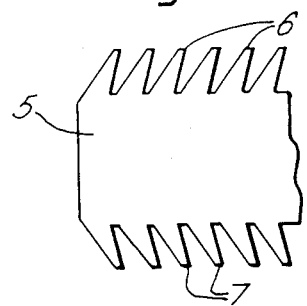
FIG. 3 shows a detail of the clip on a larger scale.

Referrring to the drawings the clip shown has the band 1 pre-shaped in the form of an open flexible ring which is of an oval shape in the open condition to allow for being closed towards a circular shape by drawing the band ends together by means of their ratchet coupling 2, 3. The tongue coupling element 2 has a root portion 4 from which extends the tongue 5 provided on its opposite sides with serrations 6 and 7. The jaws coupling element 3 has a root portion 8 from which the two jaws 9 and 10 extend as forklike branches. The jaw 9 has serrations 11 for interlocking with the tongue serrations 6 and the jaw 10 has serrations 12 for interlocking with the tongue serrations 7. The serrations of the tongue and the serrations of the jaw define teeth having near surfaces 15 sloping backwardly in a direction at an acute angle to the direction of insertion of the tongue 5 into the jaws 9 and 10. Extending as they do from the root portion 8 the jaws 9 and 10 have sufficient inherent resilience to yield to the tongue 5 when inserted through the jaws mouth 13 and to return to interlock the serrations 6 with 11 and 7 with 12. The root portions 4 and 8 have surface rib grips 14 to facilitate gripping the coupling elements 2 and 3 when closing the clip. To open the clip when closed, the then interlocking coupling elements 2 and 3 are grasped and moved relative to each other in opposite directions sideways (perpendicular to the plane of the drawing) to disengage the coupling elements sideways. This clip may be formed in one piece of a suitable plastics material.

What is claimed is:

1. A releasable hose clip for tightly clamping an article such as a hose pipe, said clip comprising
   (1) a band for encircling the article, and
   (2) a pair of interlocking elements at the respective ends of the band, said elements being interengageable with each other to secure the clip tightly around the article being clamped,
   wherein:
   (a) a first of said interlocking elements is constituted by a pair of radially-spaced jaws having a space therebetween, the radially-inner jaw having a set of teeth formed on a radially-outer face thereof and the radially-outer jaw having a set of teeth formed on a radially-inner face thereof, the teeth of each of said sets extending in an axial direction and having backwardly-sloping rear surfaces,
   (b) the other of said interlocking elements of the pair is constituted by a single-piece tongue having a set of teeth formed on each of a radially-inner face and a radially-outer face thereof, the teeth of each of said sets extending in an axial direction and having backwardly-sloping rear surfaces, said set of teeth on said tongue being capable of interengaging with said set of teeth on said jaws to secure the clip around said article, (c) said jaws define an open jaw mouth through which said tongue can be inserted in its longitudinal direction, tip first into the jaws to interengage said sets of teeth,
and
(d) the space between said jaws is open at the opposed axially spaced sides thereof to permit said tongue when engaged in the jaws to be moved axially relative to the jaws to disengage the tongue from the jaws, (e) the jaws are connected together by a resilient bridging member.

2. A releasable clip as claimed in claim 1, consisting of a one-piece moulding of a plastics material.

* * * * *